Sept. 28, 1937.     H. W. EKHOLM     2,094,035

RAILWAY BRAKE BEAM

Filed March 5, 1936

Inventor
Herbert W. Ekholm
By Rodney Bedell
Attorney

Patented Sept. 28, 1937

2,094,035

UNITED STATES PATENT OFFICE 2,094,035

RAILWAY BRAKE BEAM

Herbert W. Ekholm, Chicago, Ill., assignor to Chicago Railway Equipment Company, Chicago, Ill., a corporation of Illinois Application March 5, 1936, Serial No. 67,230

9 Claims. (Cl. 188—223)

The invention relates to railway rolling stock brake beams of the truss type which include a compression member, a strut, and a tension member extending over the strut and anchored at its ends to the ends of the compression member. Usually such beams include brake heads mounted on the ends of the beam and nuts are threaded on the ends of the tension members to be tightened against the outer faces of the brake heads to clamp the heads in place and hold the parts of the beam in rigid assembly.

The object of the present invention is to avoid the breaking of the tension member of such a beam by transferring the thrust between the nut and the compression member to the brake head, or other anchorage on the tension member, at a point spaced from the tensioning device without involving a structure which would not be interchangeable with ordinary brake heads conforming to Association of American Railroads standards.

In the accompanying drawing which illustrates the invention—

Figure 3:
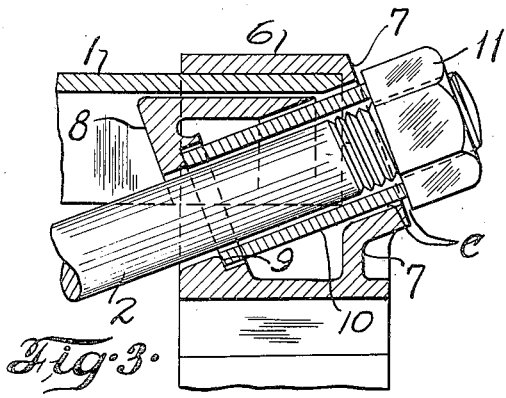
Figure 3 is a horizontal section taken through one end of the beam approximately on the line 3—3 of Figure 2.

Figures 4, 5, 6, and 7 correspond substantially to Figure 3 but illustrate different modifications of the invention.

Figure 1:
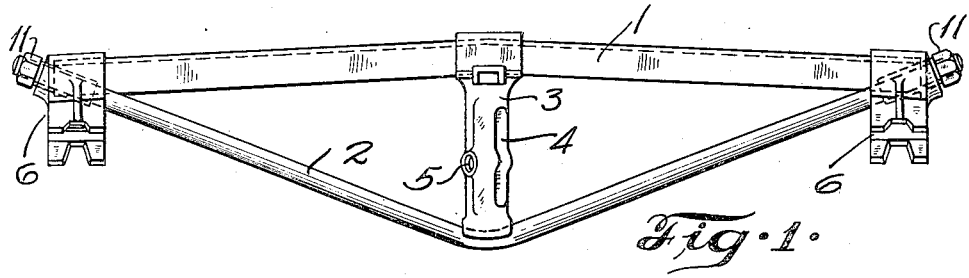
Figure 1 is a top view of a truss type brake beam embodying one form of the invention.
Figure 2:
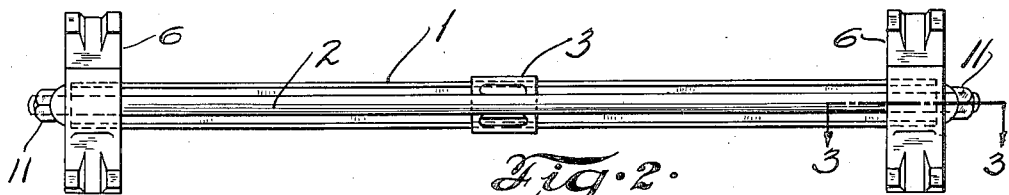
Figure 2 is a front view of the same.

In the brake beam of Figures 1, 2, and 3, compression member 1 is of U cross section, tension member 2 is a solid round rod, the strut 3 will be of cast metal and provided with a slot 4 and a fulcrum pin hole 5 for receiving and mounting the usual brake lever (not shown). Brake heads 6 will have the usual standard contours for mounting brake shoes and each head has a socket on its inner face for receiving the compression member 1, the socket terminating in an outer wall 7 which is seated against the end of the compression member.

The inner wall 8 of the head is provided with a bearing 9 facing towards the outer wall 7 of the head and recessed to receive a cylindrical sleeve or collar 10 which surrounds the end portion of tension member 2 and extends from seat 9 through the body of the brake head projecting outwardly beyond the face of wall 7, the outer end of sleeve 10 forming a seat for the nut 11 threaded upon the end of tension rod 2 but held by sleeve 10 against contact with the brake head.

Upon the tightening of nut 11, the thrust between the same and the head is transferred by sleeve 10 to seat 9 on the head, which seat is spaced a substantial distance from nut 11 and the adjacent threaded portion of tension rod 2. As braking pressure is alternately applied and released, there is a tendency for the head to move relative to the tension rod and the arrangement illustrated and described will permit such movement to take place without concentrating the transmission of the force set up by such movement to the rod at the base of nut 11.

In view of the clearance at the points marked C, rod 2 and nut 11 may shift in sleeve 10, and the rod, nut and sleeve may shift as a unit in head 6 but the pressure tending to hold the brake head tightly upon the compression member 1 is not relieved.

Figure 4:
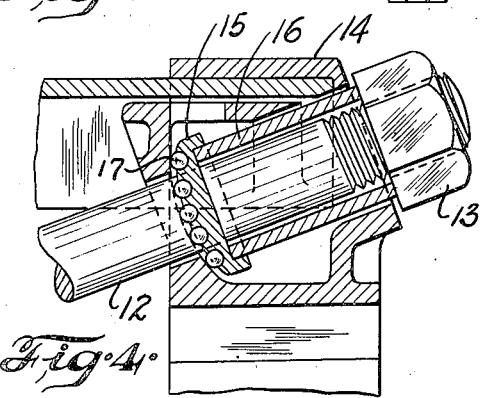

In Figure 4, the shifting or tilting of the tension rod 12 and nut 13 relative to the head 14 is facilitated by the pressure of an anti-friction bearing device 15 between the inner end of sleeve 16 and the opposing seat 17 on the brake head. Otherwise the parts are constructed and function similarly to the structure of Figure 3.

Figure 5:
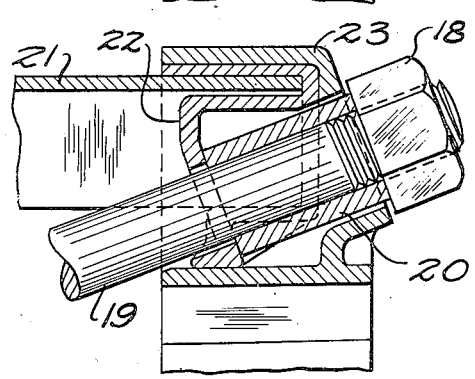

Figure 5 illustrates a modification in which the thrust of nut 18 on the tension member 19 is transferred by the sleeve 20 to the compression member 21 through an intermediate thrust receiving block 22 which receives the end of the compression member and provides a mounting for the brake head 23 which may rotate on block 22 and does not have the function of forming a part of the tension rod anchorage on the compression member.

Figure 6:
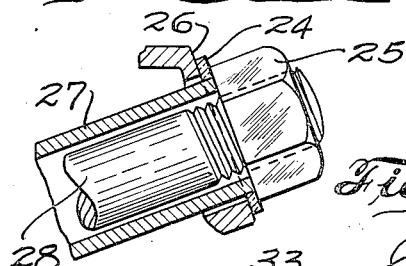

Figure 6 illustrates insertion of a compressible washer 24 between the base of the tensioning nut 25 and the outer wall 26 of the brake head or thrust block. It is to be understood that the inner end of sleeve 27 is seated against a bearing at the inner side of the head or thrust block similar to that illustrated in Figures 3, 4, and 5. While a portion of the pressure between nut 25 and the thrust block will be transferred directly through washer 24, nevertheless the latter will yield under severe stress without concentrating bending forces on the tension rod 28 at the point of application of nut 25.

Figure 7:
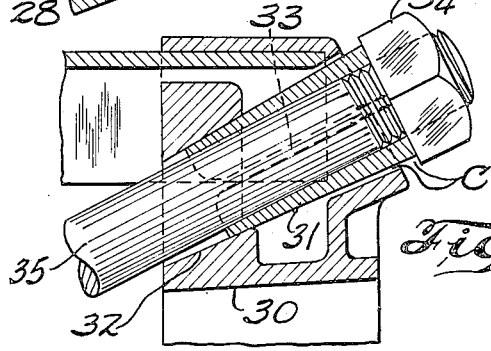

Figure 7 illustrates a modification in which the brake head 30, or corresponding thrust block member, is not provided with a positive bearing for seating the sleeve 31. The thrust block has a tapered passageway 32 and the exterior of sleeve 31 is similarly tapered so as to seat in passageway 32. Sleeve 31 is split throughout a portion or all of its length, as indicated at 33, and as it is forced to the left by tightening nut 34, the split portions of sleeve 31 will tighten on rod 35, clamping tightly against the rod and functioning as do the other sleeves to transfer the thrust from nut 34 to a portion of the brake head or thrust block spaced a substantial distance from the nut. The outer portion of the brake head clears the sleeve and nut, as indicated at C', and hence facilitates the movement of the brake head relative to the outer portion of the tension rod.

All forms of the invention avoid the concentration of transverse forces from the brake head to the rod at the point where the nut engages the rod, thus avoiding the likelihood of the rod breaking at this point.

What is claimed is:

1. In a truss type brake beam, a compression member, a thrust block mounted thereon and having an outwardly facing side, a tension member extending through said block and projecting beyond said side, a tensioning device on said tension member, and means for transferring the thrust from said device to said block at a point on the latter spaced inwardly a substantial distance from said side.

2. In a truss type brake beam, a compression member, a thrust block mounted thereon, a tension member having a portion extending through said block and projecting outwardly therefrom, a tensioning device on the end of said tension member, and a sleeve surrounding said portion and transferring thrust from said device to the inner side of said block.

3. In a truss type brake beam, a compression member, a thrust block mounted thereon and extending a substantial distance along said member, a tension member extending through said block and projecting beyond the outer face thereof, a tensioning device on said tension member, a sleeve surrounding a portion of said tension member adjacent said device and receiving the thrust of said device and transferring said thrust to a portion of said block spaced a substantial distance inwardly of said outer face.

4. In a truss type brake beam, a compression member, a thrust block mounted thereon and having on its wall nearer the middle of the beam a bearing facing towards the end of the beam, a tension member extending through said block with the part projecting beyond said bearing provided with a threaded terminal portion and with a substantial unthreaded portion, a nut on said threaded terminal portion, and a member seated at its inner end on said bearing projecting through the wall nearer the end of the beam and at its outer end providing a bearing for said nut.

5. In a truss type brake beam, a compression member, a thrust block mounted thereon and having an outwardly facing bearing, a tension member extending through said block and projecting outwardly beyond the same, a tensioning device on the outer portion of said tension member, a member having an anti-friction engagement with said bearing at its inner end and provided at its outer end with a bearing for said tensioning device.

6. In a truss type brake beam, a compression member, a thrust block mounted thereon, a tension member extending through said thrust block, a tensioning device on said tension member, means transferring the thrust from said device to said block at a point on the latter spaced a substantial distance from said device, and a brake head mounted on said block, there being substantial clearance between said head and said device and means.

7. In a truss type brake beam, a compression member, a thrust block mounted thereon and having a passageway through its inner side, said passageway flaring towards the outer side of said block, a tension member extending through said passageway, a tensioning device on said tension member, and means for transferring the thrust from said device to said block comprising a split sleeve with its inner end tapered to correspond to said passageway and gripped between the side of said passageway and said tension member, there being substantial clearance between the outer wall of said block and the corresponding portion of said sleeve and of said tensioning device.

8. In a truss type brake beam, a compression member, a brake head mounted thereon and having outwardly and inwardly facing side walls, a tension member extending through said brake head, a nut threaded onto said tension member, and a sleeve fitting around a substantial end portion of said tension member and transferring the thrust from said nut to an inwardly facing wall of said head spaced a substantial distance from said nut.

9. In a truss type brake beam, a compression member, a brake head mounted thereon, a tension member extending through said head, a tensioning device on the end of said tension member, a sleeve surrounding the portion of said tension member adjacent said device and having one end seated against said brake head with its other end seating said device, there being clearance between the sides of said sleeve and the adjacent portions of said head to avoid the concentrated application of forces transversely of said tension member from said head to said tension member at the point where said tensioning device engages said tension member.

HERBERT W. EKHOLM.